Figure 1:
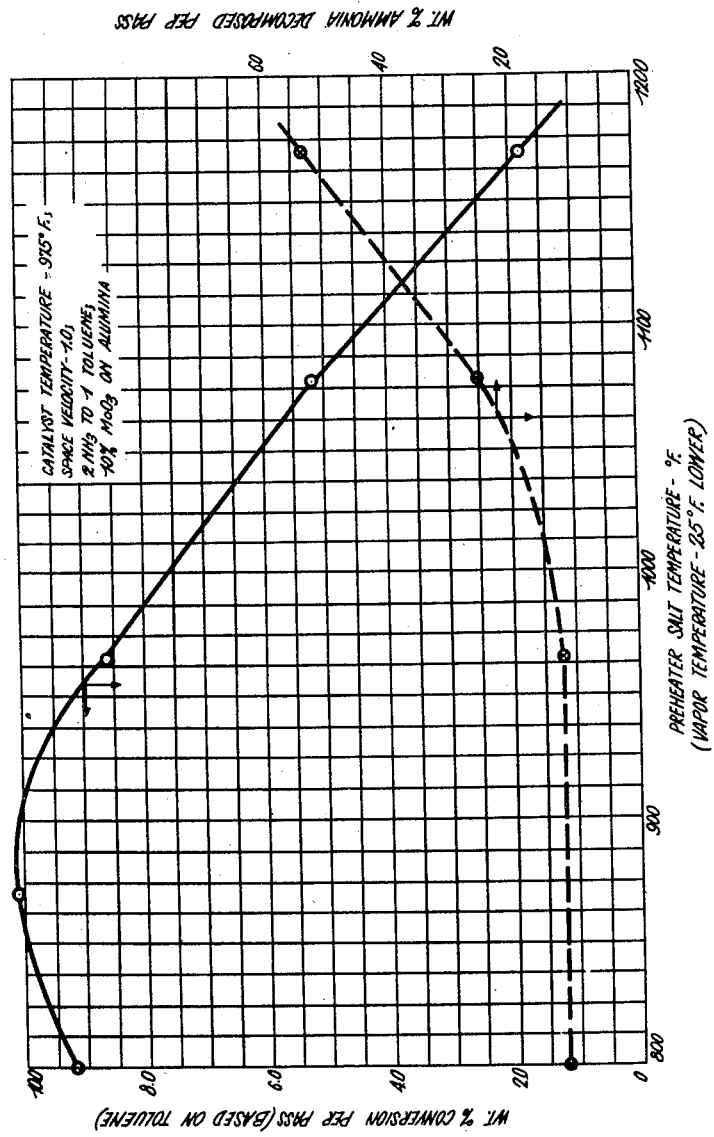

Feb. 7, 1950 W. I. DENTON 2,496,661
PRODUCTION OF NITRILES
Filed Nov. 28, 1947 6 Sheets-Sheet 1

Inventor
William I. Denton
By Dallas R. Lamont
Attorney

Feb. 7, 1950 W. I. DENTON 2,496,661
PRODUCTION OF NITRILES
Filed Nov. 28, 1947 6 Sheets-Sheet 5

EFFECT OF AMMONIA PREHEATER TEMPERATURE
TOLUENE INTRODUCED COLD

Inventor
William I. Denton
By Dallas R. Lamont
Attorney

EFFECT OF TEMPERATURE ON THERMAL AND CATALYTIC DECOMPOSITION OF AMMONIA AND TOLUENE

Patented Feb. 7, 1950

2,496,661

UNITED STATES PATENT OFFICE 2,496,661

PRODUCTION OF NITRILES

William I. Denton, Woodbury, N. J., assignor to Socony-Vacuum Oil Company, Incorporated, a corporation of New York Application November 28, 1947, Serial No. 788,677

4 Claims. (Cl. 260—329)

This invention relates to an improvement in catalytic processes for producing nitriles and is particularly concerned with an improvement in catalytic processes for producing aromatic nitriles from aromatic hydrocarbons.

Nitriles may be defined as organic cyanides, or organic compounds containing a monovalent —CN radical. They may be expediently represented by the formula R—C≡N, in which R is an organic radical which may be aliphatic, aromatic, alicyclic, heterocyclic, or mixed. Nitriles are especially useful compounds because they can be converted readily into many valuable products such as acids, amines, aldehydes, esters, and the like.

As is well known to those familiar with the art, several processes have been proposed for the preparation of aromatic nitriles. In general, however, all of these processes have been disadvantageous from one or more standpoints, namely, the relatively high cost of the reactants employed and/or the toxic nature of some of the reactants and/or the number of operations involved in the ultimate preparation. For example, aromatic nitriles have been synthesized by reacting alkali cyanides with aromatic sulfonates or with aromatic-substituted alkyl halides; by reacting more complex cyanides, such as potassium cuprous cyanide, with diazonium halides, by reacting isothiocyanates with copper or with zinc dust; and by reacting aryl aldoximes with acyl halides.

More recently, the present inventor and his coworkers have developed a series of generally similar processes for producing nitriles, which processes are simple and inexpensive, and which employ non-toxic reactants.

According to these processes, aromatic and other nitriles can be prepared by reacting such materials as aromatic hydrocarbons in which at least one nuclear hydrogen is replaced by an aliphatic hydrocarbon radical, olefins, alkyl thiophenes and primary alcohols, with ammonia at elevated temperatures, in the presence of catalytic materials. Various catalytic materials have been found satisfactory for this purpose, among them the oxides of vanadium, tungsten and molybdenum, the nickel or cobalt salts of acids that are stable under reaction conditions, and the metal salts of acids of tungsten, molybdenum and vanadium.

These processes are to be distinguished from the conventional processes for the production of hydrogen cyanide wherein carbon compounds, such as carbon monoxide, methane and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. These processes are also to be distinguished from the processes of the prior art for the production of amines wherein hydrocarbons are reacted with ammonia at high temperatures, or at lower temperatures in the presence of nickel or cobalt.

It is an object of the present invention to provide an improved process for the production of nitriles from any of the above-mentioned starting materials. Another object is to afford an improved catalytic process for the production of nitriles. An important object is to provide a process for producing nitriles that is inexpensive and commercially feasible. A specific object is to provide a process for producing aromatic nitriles from aromatic hydrocarbons in which at least one nuclear hydrogen is replaced by an aliphatic hydrocarbon radical, in a more efficient manner than was heretofore possible. Other objects and advantages of the present invention will become apparent to those skilled in the art from the following description.

Broadly stated, the present invention provides an efficient, inexpensive and commercially feasible process for the production of nitriles, which comprises reacting an organic compound with ammonia, in gaseous phase and at an elevated temperature, in the presence of a catalytic material, under certain temperature conditions hereinafter specified.

In accordance with this invention it has been discovered that although the decomposition temperature of ammonia under these reaction conditions may be considered to be about 1250° F. to 1300° F., and the catalytic reactions of ammonia with organic compounds can be conducted at temperatures ranging from about 850° F. to about 1250° F. to 1350° F., a great increase in efficiency of the processes can be achieved by not only conducting the reaction at a temperature within a much more specific range, but also by carrying out the process in such a way as to protect the ammonia against prolonged exposure to temperatures even as high as the reaction temperature, particularly in the presence of the catalyst. Thus, if the reaction is conducted at a temperature of about 950° F. to about 1025° F. and the ammonia is raised to that temperature only for a very short period of time during the reaction, greatly increased yields result and far less ammonia is decomposed.

One method of accomplishing the catalytic reaction of ammonia with organic compounds to form nitriles, in accordance with this invention, consists in preheating a mixture of ammonia and the organic compound or compounds to a temperature of approximately 850° F., then quickly contacting the mixed preheated reactants with a catalyst, at the same time raising the temperature to about 1000° F., and thereafter quickly cooling the products of the reaction and any remaining unreacted materials and by-products to a temperature of 850° F. or below.

Another method of applying the principles of this invention is to preheat the organic reactant to a temperature above that necessary for reaction and then to blend it with ammonia preheated to a temperature below 850° F. to produce a mixture having the desired reaction temperature. This mixture is then contacted with the catalyst (at a temperature of about 1000° F.) for a short period of time. Thereafter, the reaction products and unreacted materials are, as before, quickly cooled.

Generally speaking, any aromatic hydrocarbon in which at least one nuclear hydrogen is replaced by an aliphatic hydrocarbon radical, any olefin, any primary alcohol, and any heterocyclic compound in which at least one nuclear hydrogen is replaced by an aliphatic hydrocarbon radical, is suitable as the organic reactant in the process of this invention.

When the substituted aromatic hydrocarbons referred to are used in the process of this invention, they may be derived from any suitable source as is well known to those familiar with the art. Although any aromatic hydrocarbon in which at least one nuclear hydrogen is replaced by an aliphatic hydrocarbon radical may be employed for this purpose, it is preferred to use the methyl-substituted aromatic hydrocarbons, or those in which the aliphatic hydrocarbon radical substituent or at least one of the substituents is unsaturated, and more particularly, the thus substituted benzenes. Examples are toluene, xylenes, and trimethyl benzenes and styrene. It is to be understood, however, that hydrocarbon fractions containing benzenes in which at least one nuclear hydrogen is replaced by an aliphatic hydrocarbon radical may also be utilized in this process. It is to be understood further that other aromatic hydrocarbons in which at least one nuclear hydrogen is replaced by an aliphatic hydrocarbon radical, such as methyl-substituted naphthalenes, and fractions containing the same, may be employed in the present process.

When olefinic hydrocarbons are used, in accordance with this invention, it may be generally stated that any olefinic hydrocarbon having at least one olefin group ($>C=C<$) is suitable as the hydrocarbon reactant in the process of this invention. Ethylene, propylene, butenes, octenes, methyl heptenes, butadienes, pentadienes, ethyl butenes, hexadienes, heptenes, pentenes, etc., may be mentioned by way of non-limiting examples. It will be clear from the discussion of the reaction temperatures mentioned, that many olefinic hydrocarbons are not present per se when in contact with ammonia and a catalyst of the type used herein, for many of them are cracked to related hydrocarbons under such conditions. Nevertheless, all olefinic hydrocarbons and their hydrocarbon decomposition products, which are in the vapor phase under the herein-defined reaction conditions serve the purpose of the present invention. It is to be understood also that hydrocarbon mixtures containing one or more olefinic hydrocarbons may also be used herein, and that when such mixtures are used, the reaction conditions, such as contact time, will be slightly different in view of the dilution effect of the other constituents present with the olefinic hydrocarbon or hydrocarbons. Accordingly, olefinic hydrocarbons, mixtures thereof, and hydrocarbon mixtures containing one or more of such olefinic hydrocarbons may be used.

Although any olefinic hydrocarbon having at least one olefin group may be utilized in this process, it is especially preferred to use those containing up to about ten carbon atoms, and of these, propylene, butenes, and butadienes are especially preferred.

When alcohols are to be used in the process of this invention, it may be generally stated that any primary alcohol is suitable. It is preferred, however, to use primary alcohols containing not less than two nor more than eighteen carbon atoms, because these are known to be particularly susceptible to this process. Ethyl alcohol, n-propyl alcohol, n-butyl alcohol, 2-methyl propyl alcohol, benzyl alcohol, decanol-1, tetradecanol-1 and octanol-1 may be cited as examples of satisfactory starting materials. Branching of the hydrocarbon chains of the alcohols does not interfere with the reaction of this invention but secondary and tertiary alcohols do not have a sufficient number of valence bonds available to form nitriles. However, it is possible for cracking to occur and lower molecular weight nitriles to be formed from secondary and tertiary alcohols of higher molecular weight. Polyhydric alcohols in which one or more of the alcohol radicals is attached to a primary carbon atom will react in accordance with this invention. For example, a di-nitrile may be formed from glycol or a poly-nitrile from such materials as pentaerythritol. Mixtures of alcohols as well as a single pure alcohol may be used.

It will be understood also that hydrocarbon mixtures containing one or more primary alcohols may be used herein, and that when such mixtures are used, the reaction conditions, such as the contact time, will be slightly different in view of the dilution effect of the non-reacting constituents present.

As to heterocyclic compounds that may be used in accordance with this invention, perhaps the best examples are the alkyl-substituted thiophenes. Generally speaking, any alkyl thiophene or homologue thereof may be used as the heterocyclic reactant in the process of this invention. Other heterocyclic compounds containing one or more alkyl groups attached to the ring structure of the compound may be used. The alkyl substituent of thiophene type compounds to be used in the process of this invention may be derived from any suitable source as is well known to those familiar with the art. Simple mono-, di-, and poly-methyl-substituted thiophenes are preferred, although the principles of this invention are applicable to thiophenes substituted by longer chain aliphatic hydrocarbon radicals, both saturated and unsaturated. Furthermore, the reaction of this invention may be performed with any thiophene or thiophene homologue, or other heterocyclic compound which does not contain interfering substituents or structures inimical to the reaction of this invention and in which at least one hydrogen atom of the nucleus has been replaced by an aliphatic hydrocarbon radical, regardless of whether or not the other hydrogen atoms on the nucleus have been replaced by other substituents. Since most stable substituents are non-interfering for the purpose of this invention, an extremely wide choice of such substituents is possible. Preferred examples of satisfactory heterocyclic starting materials are mono-, di-, tri-, and tetra-methyl thiophene.

Since aromatic hydrocarbons in which at least one nuclear hydrogen is replaced by an aliphatic hydrocarbon radical, olefins, alcohols, and heterocyclic compounds in which at least one nuclear hydrogen is replaced by an aliphatic hydrocarbon radical, are all satisfactory as starting materials, mixtures of these compounds are also satisfactory.

The proportions of reactants, i. e., organic reactant and ammonia, to be used in this process may be varied over a wide range with little effect upon the conversion per pass or the ultimate yield. In general, the charge of reactants may contain as little as 2 mol % or as much as 98 mol % of the organic reactant. In practice, however, it is preferred to use charges containing between about 20 mol % and about 90 mol % of the organic reactant and, ordinarily, it is preferred to use charges containing a molar excess of ammonia over the organic reactant.

It has been found that the catalysts to be used to produce organic nitriles by reacting organic materials with ammonia under the particular conditions of this invention, are those containing a vanadium oxide, such as vanadium monoxide (VO), vanadium trioxide ($V_2O_3$), vanadium dioxide ($V_2O_2$), and vanadium pentoxide ($V_2O_5$); a molybdenum oxide such as molybdenum sesquioxide ($Mo_2O_3$), molybdenum dioxide ($MoO_2$), molybdenum trioxide ($MoO_3$), molybdenum pentoxide ($Mo_2O_5$); a tungsten oxide such as tungsten dioxide ($WO_2$), tungsten trioxide ($WO_3$); a salt of molybdic acid such, for example, as uranyl molybdate, ferrous molybdate, ferric molybdate, sodium molybdate, sodium di-molybdate, sodium tri-molybdate, sodium tetra-molybdate, sodium octa-molybdate, and sodium deca-molybdate, the corresponding potassium molybdates, and iron, lead, and copper molybdates. Of the molybdates, ferric molybdate and uranyl molybdate are especially preferred.

In addition to these catalysts, salts of nickel or cobalt and an acid that is stable under reaction conditions, may also be used. Nickel phosphate, sulfate and chloride are examples of catalysts of this type. Of such catalysts nickel phosphate is preferred.

While all of the above-mentioned catalysts are satisfactory, they exhibit different degrees of effectiveness when used per se, and they generally possess additional catalytic activity when used in conjunction with well-known catalyst supports, such as alumina, silica gel, carborundum, pumice, clays and the like. It has been found especially preferable to use alumina ($Al_2O_3$) as a catalyst support, and it has been found that a catalyst comprising one of the above-mentioned catalytic materials supported on alumina is particularly useful for the present purpose. Without any intent of limiting the scope of the present invention, it is suspected that the enhanced catalytic activity of the supported catalysts is attributable primarily to their relatively large surface area.

The concentration of catalytic material in the supported catalysts influences the conversion per pass. In general, the conversion per pass increases with increase in the concentration of catalytic material. For example, it has been found that a catalyst comprising 20 parts by weight of molybdenum trioxide on 80 parts by weight of alumina is more effective than one comprising 10 parts by weight of molybdenum trioxide on 90 parts by weight of alumina. It is to be understood, however, that supported catalysts containing larger or smaller amounts of catalytic material may be used in our process.

It has also been found that in order to obtain initial maximum catalytic efficiency, particularly where the catalytic material comprises the higher catalytic metal oxides, that the catalysts should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of the process when the catalyst comes in contact with the ammonia reactant.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated, as is well known in the art, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

At the present time, the reaction mechanism involved in the process of the present invention is not fully understood. Fundamentally, the simplest possible method of making, for example, aromatic nitriles is to introduce nitrogen directly into the hydrocarbon radical of the substituted aromatic hydrocarbon molecule, thereby avoiding intermediate steps with their accompanying increased cost. In our process, we have noted that considerable amounts of hydrogen are evolved; hence, it is postulated, without any intent of limiting the scope of the present invention, that the aromatic nitriles are formed in accordance with the following equations, using toluene, xylene and mesitylene as examples:

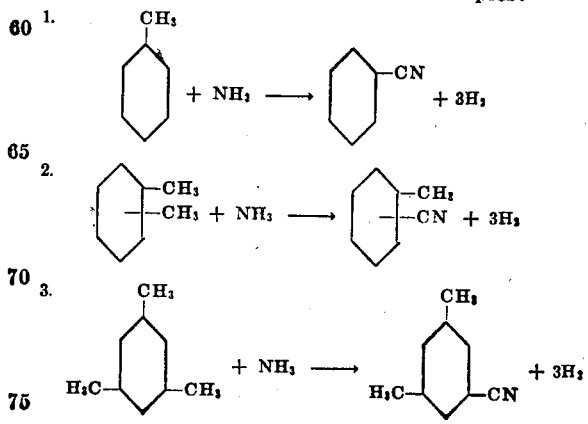

The present process may be carried out by making use of any of the well-known techniques for operating catalytic reactions in the vapor phase effectively. By way of illustration, toluene and ammonia may be brought together in suitable proportions and the mixture vaporized in a preheating zone. The vaporized mixture may then be introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth herein, and the resulting reaction mixture is passed through a condensing zone into a receiving chamber.

It will be understood that when the catalyst flows concurrently, or countercurrently, with the reactants in the reaction chamber, the catalyst will be thereafter suitably separated from the reaction mixture by filtration, or the like.

The reaction mixture will be predominantly a mixture of benzonitrile, hydrogen, unchanged toluene, and unchanged ammonia. The benzonitrile and the unchanged toluene will be condensed in passing through the condensing zone and will be retained in the receiving chamber. Benzonitrile can be separated from the unchanged toluene by any of the numerous and well-known separation procedures, such as fractional distillation. Similarly, the uncondensed hydrogen and unchanged ammonia can be separated from each other. The unchanged toluene and ammonia can be recycled, with or without fresh toluene and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when one or more catalyst chambers are used, through which the catalyst flows in contact with the reactants. In such a continuous process, the catalyst will flow through the reaction zone in contact with the reactants and will thereafter be separated from the reaction mixture, as for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The reaction or contact time, that is, the period of time in which a unit volume of the reactants is in contact with a unit volume of catalyst, may vary between a fraction of a second and several minutes. Thus, the contact time may be as low as 0.01 second and as high as 20 minutes. It has been found preferable to use contact times varying between about 0.01 second and about one minute, particularly between about 0.3 second and about 30 seconds. It must be realized that these figures are, at best, estimates based on a number of assumptions. For all practical purposes, in catalytic processes of the type of the present invention, the more reliable data on contact time is best expressed, as is well known in the art, in terms of liquid-space velocities, in the present instance, the volume of liquid organic reactant per volume of catalyst per hour. For example, at atmospheric pressure, it has been found that the space velocities may be varied considerably and that velocities varying between about one-fourth and about four are quite satisfactory for the purposes of the present invention.

In previously filed patent applications this inventor and his co-workers stated that temperatures could be used varying between about 850° F. and the decomposition temperature of ammonia (about 1250° F.–1300° F.). While it is true that such temperatures can be used, it has now been discovered that for maximum efficiency the temperature of reaction, that is, the catalyst temperature, should be maintained between about 950° F. and about 1075° F., and better still between about 975° F. and about 1025° F. The maintenance of the temperature between these limits is an important and critical factor in obtaining high yields. Contrary earlier experience, it has now been discovered that temperatures in excess of about 1075° F. do not produce increased yields, but on the contrary produce greatly decreased yields. Although there appear to be some minor differences in the most desirable temperature, depending upon the organic reactant used, the temperature appears to depend mainly upon the characteristics of ammonia and hence to be relatively fixed.

Another very important feature of this invention has been the result of the discovery that although the normal decomposition temperature of ammonia is not reached until a temperature of about 1250° F. to 1300° F. is attained, important decreases in yield result, and important losses of ammonia to decomposition result well below this temperature, if the ammonia is exposed to too high a temperature or for too long a time at elevated temperatures in the presence of a catalyst. Thus, it has been found highly important to avoid the use of temperatures above about 925° F. in the ammonia preheater and above about 1075° F. in the catalyst case. It has also been found very important to preheat one or both of the reactants prior to their exposure to the catalyst so that they can be brought quickly to the reaction temperature and thus minimize the length of time during which it is necessary to expose them, and particularly the ammonia, to the catalyst, at reaction temperatures.

It has also been found important not to preheat the ammonia above about 1050° F. alone, or not to more than about 925° F. in the presence of the organic reactant. Preferably, the ammonia mixed with the organic reactant should be preheated to about 850° F. to 900° F. and then quickly heated to reaction temperature when brought into contact with the catalyst, or the organic reactant should be preheated to a temperature above that of reaction and then mixed with ammonia preheated to a temperature below 850° F. so that the temperature of the mixture thus obtained is equal to the desired reaction temperature.

The contact time should then be adjusted to give maximum yield and minimum decomposition. This will usually result at a space velocity of about 1.0. The organic reactant can be preheated and mixed with cold ammonia at the time the two reactants are introduced to the catalyst chamber, if desired. Ammonia can be preheated and mixed with cold organic reactant at the time the two are introduced to the catalyst chamber, but the yields so obtained are generally not quite so high, the decomposition losses are generally somewhat higher, and the conditions are even more critical.

The process of the present invention may be carried out at superatmospheric, atmospheric or subatmospheric pressures. Superatmospheric pressures are advantageous in that unreacted charge materials condense more readily. Subatmospheric pressures appear to favor the reactions involved since the reaction products have a larger volume than the reactants and, hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

When superatmospheric pressures are used the product of the reaction can be expediently cooled by releasing the pressure. When atmospheric pressure is used, it is desirable to cool the products immediately after reaction by conventional heat transfer means.

A considerable series of test runs have been conducted in order to establish the fact that the temperature to which the ammonia is heated has a critical effect on the ultimate yields and conversion per pass to nitriles. These tests show that if the ammonia is heated to too high a temperature, an increase in the amount of decomposition of the ammonia results.

Normally, it would be expected that increasing the decomposition of the ammonia would increase the number of free radicals available to react with the organic reactant, thus increasing the conversion per pass to nitriles. Contrary to this, it has been found that as the ammonia temperature is raised and decomposition increases, the amount of nitriles formed decreases, resulting in lower conversions per pass and poorer ultimate yields.

The following detailed examples are for the purpose of illustrating modes of preparing organic nitriles in accordance with the process of our invention, it being clearly understood that the invention is not to be considered as limited to the specific substituted aromatic hydrocarbon reactants disclosed hereinafter or to the exact manipulations and conditions set forth in the examples. As it will be apparent to those skilled in the art, a wide variety of other organic nitriles may be prepared by use of the corresponding organic reactants.

In the test runs a reactor consisting of a shell containing a catalyst chamber, heated by circulating a heat-transfer medium thereover, and containing 100 parts by weight of a catalyst comprising 10 parts by weight of molybdenum trioxide on 90 parts by weight of alumina, was used in each instance. Ammonia and toluene were introduced in various ways and under various conditions into this reactor. The reaction mixture was passed from the reactor, through a condenser, into a first receiving chamber. Hydrogen and unchanged ammonia were collected in a second receiving chamber and then separated from each other. The nitriles and unchanged toluene remained in the first receiving chamber and were subsequently separated by distillation. The pertinent data and the results of each run are tabulated in the following tables:

TABLE I

*Effect of preheater temperature, °F., reactants mixed cold and preheated together*

| Run No. | Preheater Salt Temp. | Reactor Salt Temp. | Catalyst Temperature | | | Conversion per pass (Wt. per cent on Toluene) | Wt. per cent Ammonia Decomposed [1] |
|---|---|---|---|---|---|---|---|
| | | | Bottom (in) | Middle | Top (out) | | |
| 1 | 800 | 1,005 | 930 | 980 | 975 | 9.2 | 12 |
| 2 | 870 | 1,005 | 976 | 978 | 978 | 10.1 | |
| 3 | 960 }966 | 1,000 | 975 | 977 | 977 | 8.5 }8.6 | 14 }12 |
| 4 | 972 | 1,003 | 973 | 975 | 978 | 8.7 | 10 |
| 5 | 1,077 | 1,001 | 975 | 975 | 976 | 5.2 | 25 |
| 6 | 1,170 | 1,004 | 974 | 973 | 978 | 1.8 | 53 |

[1] $\frac{\text{Gm. N}_2+\text{H}_2 \text{ formed}}{\text{Gm. NH}_3 \text{ charged}}$ Space velocity, 1.0; 2 moles NH₃ to one of toluene. Catalyst temperature, 975° F.

TABLE II

*Effect of toluene preheater temperature, °F., ammonia introduced cold*

| Run No. | Hydrocarbon Preheater Salt Temp. | Reactor Salt Temp. | Catalyst Temperature | | | Conversion per pass (Wt. per cent on Toluene) | Wt. per cent Ammonia Decomposed [1] |
|---|---|---|---|---|---|---|---|
| | | | Bottom (in) | Middle | Top (out) | | |
| 7 | 800 | 1,010 | 980 | 980 | 980 | 10.0 | 16 |
| 8 | 876 | 1,006 | 973 | 978 | 978 | 9.8 | 11 |
| 9 | 927 | 1,000 | 973 | 972 | 972 | 9.1 | 15 |
| 10 | 976 | 1,000 | 974 | 975 | 975 | 8.5 }9.2 | 10 |
| 11 | 975 | 1,005 | 977 | 975 | 965 | 10.0 | |
| 12 | 1,024 | 1,004 | 971 | 976 | 977 | 8.9 | 7 |
| 13 | 1,075 | 1,003 | 975 | 977 | 977 | 9.1 | 11 |
| 14 | 1,175 | 1,010 | 971 | 975 | 975 | 9.0 | 5 |

[1] $\frac{\text{Gm. N}_2+\text{H}_2 \text{ formed}}{\text{Gm. NH}_3 \text{ charged}}$ Space velocity, 1.0; 2 moles NH₃ to one of toluene. Catalyst temperature, 975° F.

TABLE III

*Effect of reactor temperature, °F., ammonia introduced cold, toluene preheater at 900° F.*

| Run No. | Hydro-carbon Preheater Salt Temp. | Reactor Salt Temp. | Catalyst Temperature | | | Conversion per pass (Wt. Percent on Toluene) | Wt. Percent Ammonia Decomposed [1] |
|---|---|---|---|---|---|---|---|
| | | | Bottom (in) | Middle | Top (out) | | |
| 15 | 900 | 926 | 905 | 902 | 894 | 6.8 | 5 |
| 16 | 900 | 975 | 954 | 952 | 948 | 8.8 | 7 |
| 17 | 902 | 1,034 | 1,003 | 1,004 | 1,001 | 9.9 | 13 |
| 18 | 900 | 1,078 | 1,052 | 1,051 | 1,046 | 9.5 | 31 |

[1] $\frac{\text{Gm. N}_2+\text{H}_2 \text{ formed}}{\text{Gm. NH}_3 \text{ charged}}$ Space velocity, 1.0; 2 moles NH$_3$ to one of toluene. Preheater temperature, 900° F.

TABLE IV

*Effect of reactor temperature, °F., ammonia introduced cold, toluene preheater at 1050° F.*

| Run No. | Hydro-carbon Preheater Salt Temp. | Reactor Salt Temp. | Catalyst Temperature | | | Conversion per pass (Wt. Percent on Toluene) | Wt. Percent Ammonia Decomposed [1] |
|---|---|---|---|---|---|---|---|
| | | | Bottom (in) | Middle | Top (out) | | |
| 19 | 1,050 | 930 | 905 | 900 | 895 | 6.3 | 3 |
| 20 | 1,050 | 980 | 955 | 950 | 945 | 8.3 | 7 |
| 21 | 1,050 | 1,025 | 1,005 | 1,005 | 995 | 9.3 | 11 |
| 22 | 1,050 | 1,080 | 1,045 | 1,045 | 1,045 | 8.7 | 11 |

[1] $\frac{\text{Gm. N}_2+\text{H}_2 \text{ formed}}{\text{Gm. NH}_3 \text{ charged}}$ Space velocity, 1.0; 2 moles NH$_3$ to one of toluene. Preheater temperature, 1050° F.

TABLE V

*Effect of preheater temperature, °F., toluene introduced cold*

| Run No. | Ammonia Preheater Salt Temp. | Reactor Salt Temp. | Catalyst Temperature | | | Conversion per pass (Wt. Percent on Toluene) | Wt. Percent Ammonia Decomposed [1] |
|---|---|---|---|---|---|---|---|
| | | | Bottom (in) | Middle | Top (out) | | |
| 23 | 900 | 995 | 975 | 975 | 975 | 8.1 | |
| 24 | 1,000 | 1,005 | 975 | 975 | 960 | 8.5 | 14 |
| 25 | 1,100 | 1,010 | 975 | 975 | 970 | 4.9 | 34 |

[1] $\frac{\text{Gm. N}_2+\text{H}_2 \text{ formed}}{\text{Gm. NH}_3 \text{ charged}}$ Space velocity, 1.0; 2 moles NH$_3$ to one of toluene. Catalyst temperature, 975° F.

TABLE VI

*Effect of temperature on thermal and catalytic decomposition of ammonia and toluene, separately*

| Run No. | Temperatures, ° F. | | | Wt. Per Cent Ammonia Decomposed [1] | Wt. Per Cent Toluene Decomposed [1] | Catalyst |
|---|---|---|---|---|---|---|
| | Preheater | Catalyst | | | | |
| | | In | Out | | | |
| 26 | 975 | 980 | 982 | 4.5 | | None. |
| 27 | 1,050 | 1,052 | 1,050 | 11.1 | | Do. |
| 28 | 1,050 | 1,048 | 1,050 | 36.5 | | (10% MoO$_3$ on alumina). |
| 29 | 1,148 | 1,153 | 1,150 | 36.0 | | None. |
| 30 | 975 | 981 | 981 | | 0.2 | Do. |
| 31 | 1,051 | 1,052 | 1,047 | | 0.2 | Do. |
| 32 | 1,050 | 1,055 | 1,055 | | 6.0 | (10% MoO$_3$ on alumina). |
| 33 | 1,148 | 1,150 | 1,150 | | 0.1 | None. |
| 34 | 1,155 | 1,152 | 1,152 | | 10 to 13 | (10% MoO$_3$ on alumina). |

[1] Accurate to ± 2%—determined from analysis of non-condensed gases and analysis for amount of coke formed.

Figure 2:
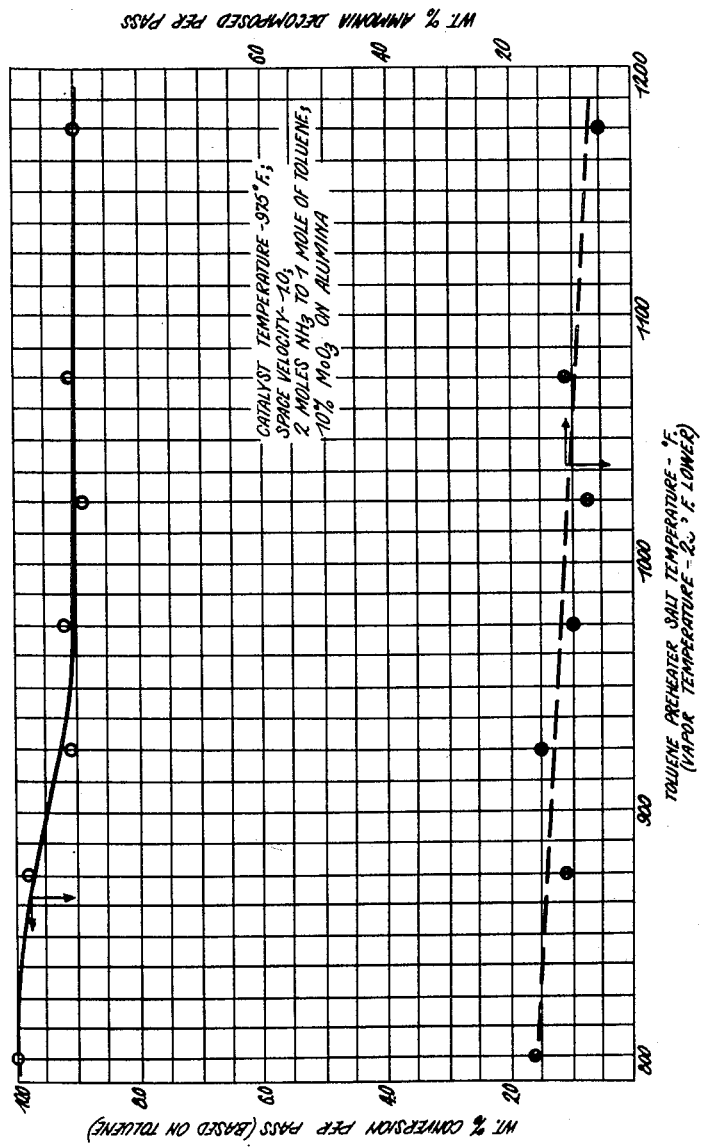
Figure 3:
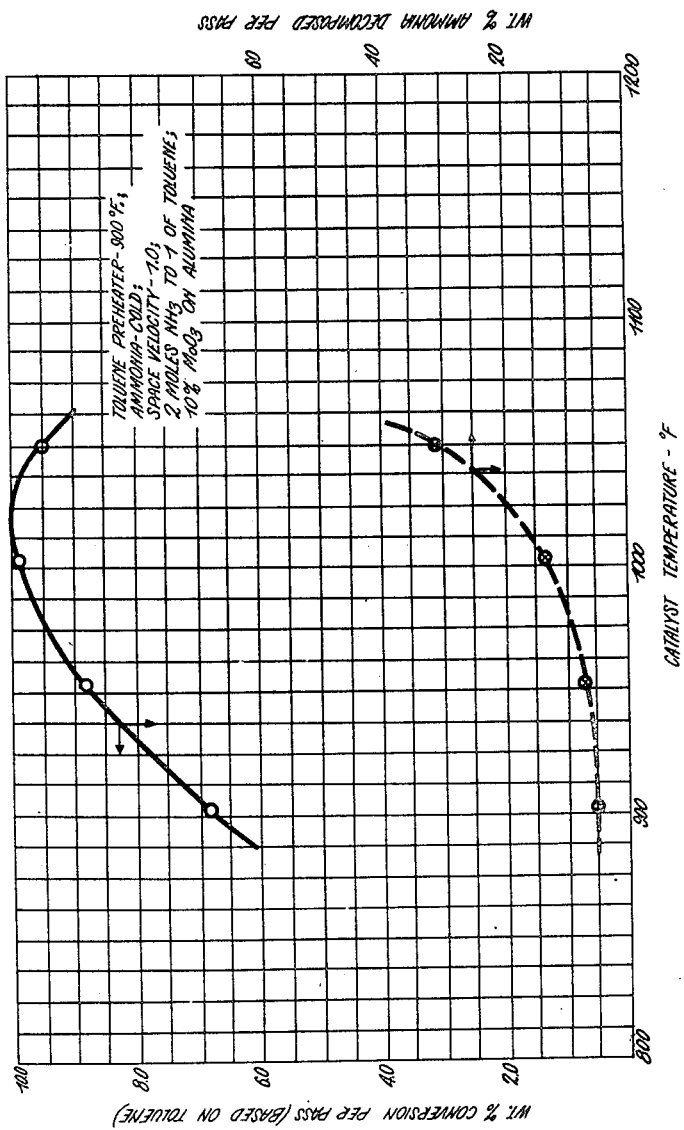
Figure 4:
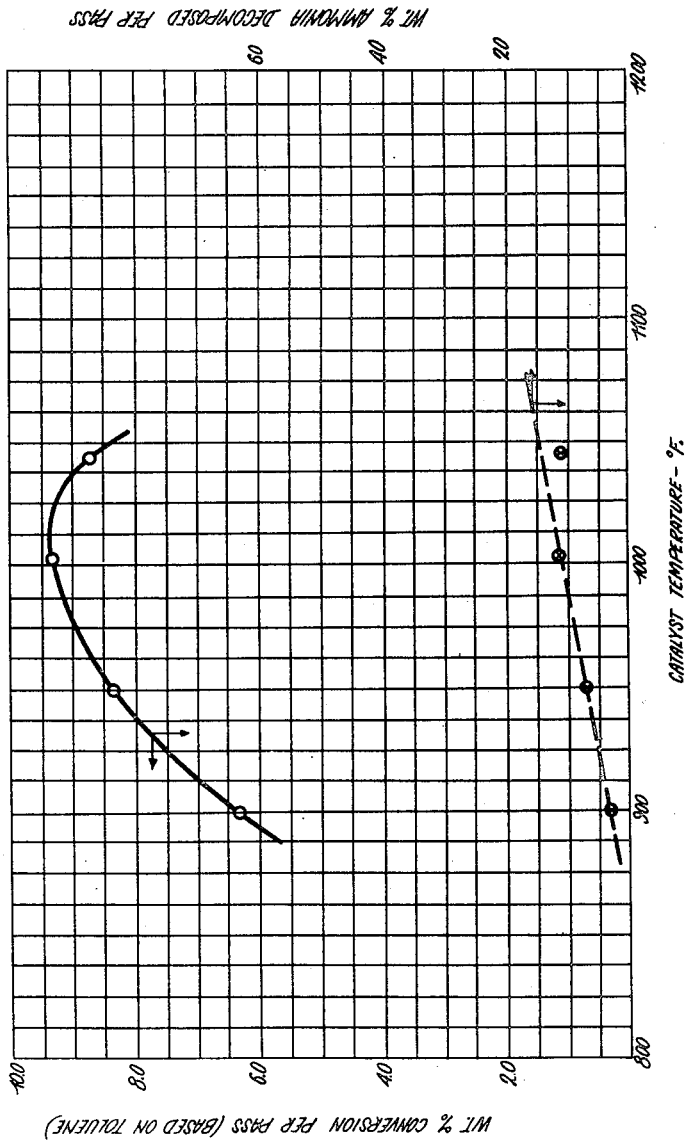
Figure 5:
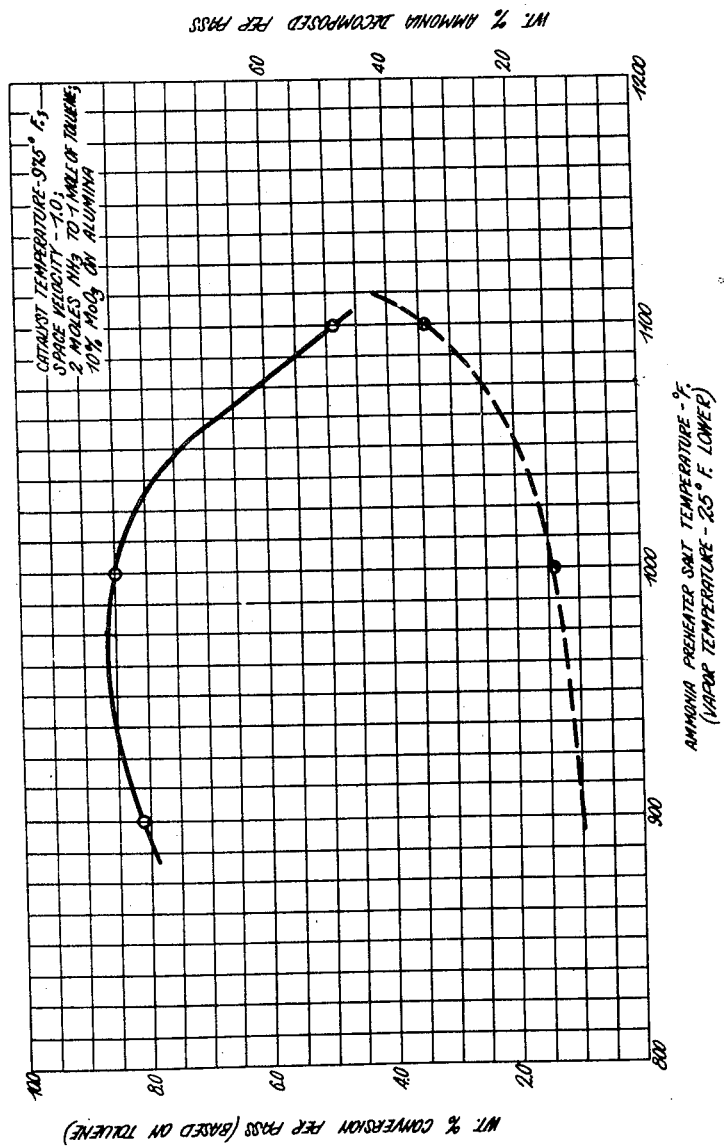
Figure 6:
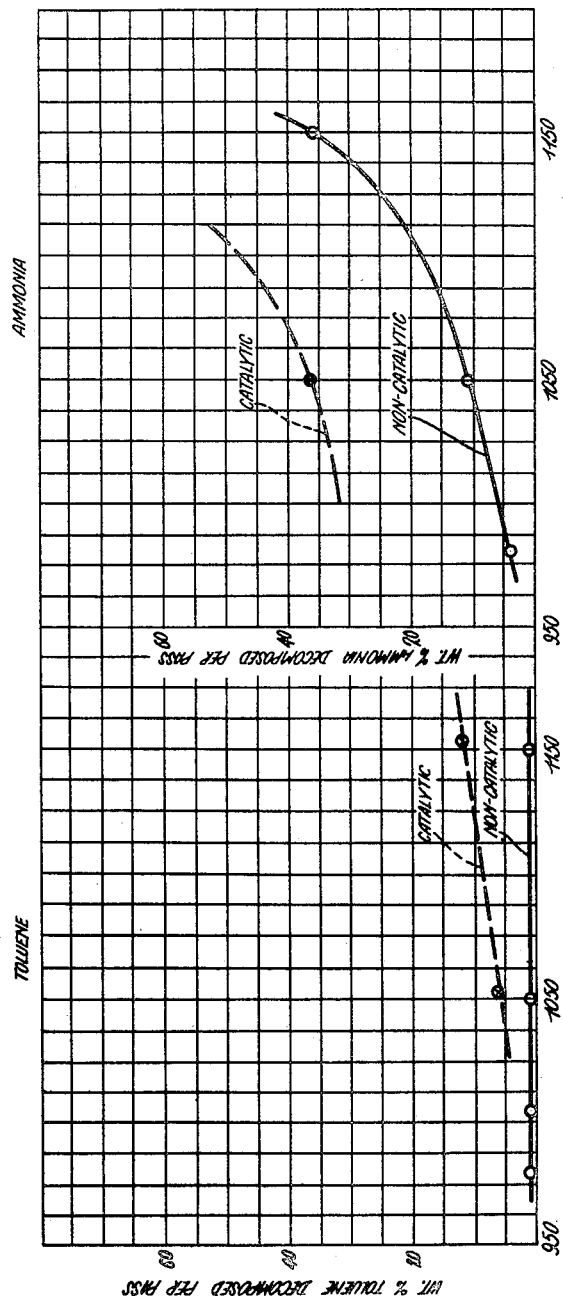

The results of the above-tabulated test runs can be seen graphically by reference to the drawings in which Figure 1 is a graphic illustration of the effect of preheater temperature when the reactants are mixed cold and preheated together; Figure 2 is a graphic illustration of the effect of preheating the toluene while introducing the ammonia cold; Figure 3 is a graphic illustration of the effect of catalyst temperature when the ammonia is introduced cold and the toluene is preheated to 900° F.; Figure 4 is a graphic illustration of the effect of reaction temperature with the ammonia introduced cold and the toluene preheated to 1050° F.; Figure 5 is a graphic illustration of the effect of preheating the ammonia with the toluene introduced cold; and Figure 6 is a graphic illustration of the effect of temperature on the thermal and catalytic decomposition of ammonia and toluene, separately.

Tables I to VI and Figures 1 to 6 list and graphically illustrate the data on the effect of temperature in the nitrile reaction as it effects both ammonia decomposition and the conversion per pass to nitriles.

Figure 1 and Table I show that under a given set of operating conditions, when toluene and ammonia are mixed cold and preheated together, with the catalyst temperature fixed at 975° F., the conversion per pass decreases and the amount of ammonia decomposed increases as the preheater temperature is increased. This figure and table also show that below a certain temperature the yield per pass begins to decrease as the temperature is decreased.

Table II and Figure 2 show that under the same conditions, the temperature to which the organic reactant is separately preheated has little or no effect on the conversion per pass and on the amount of ammonia decomposed, if the ammonia is introduced to the reactor cold. The slight decrease in the amount of ammonia decomposition is within the limits of experimental error.

Table III and Figure 3 illustrate that with the organic reactant preheated to 900° F. and the ammonia introduced cold, the conversion per pass rises to a maximum and then falls off with increasing catalyst temperature, while the ammonia decomposition increases as the reaction temperature is increased. The same results are obtained when the organic reactant is preheated to a temperature 150° F. higher (1050° F.). This is shown in Table IV and Figure 4. However, with the 1050° F. organic reactant preheat temperature, the conversion per pass averages about 0.5% less.

No abrupt increase in ammonia decompositions was noted at higher catalyst temperatures in the data in Figure 4. It is likely that the "break point" of the ammonia decomposition curve occurs at about 1075° F. or that the figure obtained at 1045° F. is somewhat in error since other data indicates that ammonia decomposition should be considerably higher at this temperature.

Table V and Figure 5 show that ammonia decomposition is the chief factor in causing the decrease in conversion per pass of higher catalyst temperatures. In the runs of this series, the toluene was introduced cold and the ammonia preheater temperature increased, while maintaining the catalyst temperature at 975° F. These data show that conversion per pass falls off rapidly with increasing ammonia preheater temperatures while the data in Table II and Figure 2 show that the toluene preheater temperature has little or no effect on conversion per pass. Therefore, the ammonia can be considered to be the critical component of the mixture.

To substantiate this fact further, a series of runs were made in which ammonia and toluene were passed through the process separately under reaction conditions identical to the above runs and the amount of decomposition, both thermal and catalytic, in the presence of molybdic oxide on activated alumina, was measured at various temperatures. These data are presented in Table VI and Figure 6. Figure 6 shows that at a given temperature the decomposition of the ammonia is far greater than that of the toluene, both thermally and catalytically. This again indicates that the amount of ammonia decomposition is the critical factor causing reduced conversions at higher temperatures. While some organic reactants undergo more decomposition at the temperatures here involved than does toluene, this decomposition has relatively little effect on the nitrile formation and, hence, even in such cases, the ammonia is the critical reactant.

The above data show that reaction temperatures of about 925° F. to about 1075° F. and preferably of about 975° F. to about 1025° F. should be used for maximum yields and that the ammonia should not be preheated above about 925° F. Since these data also show that ammonia is decomposed at the preferred reaction temperatures, it will immediately be apparent that it is desirable to maintain the ammonia at the reaction temperature for as short a period of time as is reasonably possible.

It will be apparent that the present invention provides an efficient, inexpensive and safe process for obtaining nitriles, particularly those of the benzene series. This process is of considerable value in making available relatively inexpensive aromatic nitriles which are useful, for example, as intermediates in organic syntheses. It is also useful for making aliphatic nitriles and heterocyclic nitriles.

Although the present invention has been described in conjunction with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. In a process for manufacturing organic nitriles, which includes contacting an organic reactant selected from the group consisting of a lower alkyl-substituted aromatic hydrocarbon having at least one nuclear hydrogen replaced by a univalent aliphatic non-acetylenic hydrocarbon radical and containing at least seven and up to eleven, inclusive, carbon atoms per molecule and a methyl-substituted thiophene, with ammonia, in gaseous phase, at an elevated temperature and in the presence of a catalyst; the improvement that comprises preheating ammonia to a temperature of about 800° F. to about 975° F., and contacting the preheated ammonia and the organic reactant with said catalyst at a temperature falling within the range varying between about 950° F. and about 1075° F., for a period of time sufficient to produce optimum yields of organic nitriles and maintain the decomposition of ammonia to a minimum.

2. In a process for manufacturing organic nitriles, which includes contacting an organic reactant selected from the group consisting of a lower alkyl-substituted aromatic hydrocarbon having at least one nuclear hydrogen replaced by a univalent aliphatic non-acetylenic hydrocarbon radical and containing at least seven and up to eleven, inclusive, carbon atoms per molecule and a methyl-substituted thiophene, with ammonia, in gaseous phase, at an elevated temperature and in the presence of a catalyst; the improvement that comprises separately preheating ammonia to a temperature of about 900° F. to about 925° F., mixing the preheated ammonia with the organic reactant to produce a reactant mixture, and contacting the reactant mixture with said catalyst at a temperature falling within the range varying between about 950° F. and about 1075° F., for a period of time sufficient to produce optimum yields of organic nitriles and maintain the decomposition of ammonia to a minimum.

3. In a process for manufacturing organic nitriles, which includes contacting an organic reactant selected from the group consisting of a lower alkyl-substituted aromatic hydrocarbon having at least one nuclear hydrogen replaced by a univalent aliphatic non-acetylenic hydrocarbon radical and containing at least seven and up to eleven, inclusive, carbon atoms per molecule and a methyl-substituted thiophene, with ammonia, in gaseous phase, at an elevated temperature and in the presence of a catalyst; the improvement that comprises mixing the organic reactant with ammonia, preheating the mixture of ammonia and organic reactant to a temperature of about 850° F. to about 900° F., and contacting the mixture with said catalyst at a temperature falling within the range varying between about 950° F. and about 1075° F., for a period of time sufficient to produce optimum yields of organic nitriles and maintain the decomposition of ammonia to a minimum.

4. In a process for manufacturing organic nitriles, which includes contacting an organic reactant selected from the group consisting of a lower alkyl-substituted aromatic hydrocarbon having at least one nuclear hydrogen replaced by a univalent aliphatic non-acetylenic hydrocarbon radical and containing at least seven and up to eleven, inclusive, carbon atoms per molecule and a methyl-substituted thiophene, with ammonia, in gaseous phase, at an elevated temperature and in the presence of a catalyst; the improvement that comprises separately preheating ammonia to a temperature of about 900° F. to about 925° F., separately preheating the organic reactant to such a temperature that when mixed with the preheated ammonia it will produce a reactant mixture having a temperature falling within the range varying between about 950° F. and about 1075° F., mixing the separately preheated organic reactant with the separately preheated ammonia, and contacting the reactant mixture with said catalyst at a temperature falling within the range varying between about 950° F. and about 1075° F., for a period of time sufficient to produce optimum yields of organic nitriles and maintain the decomposition of ammonia to a minimum.

WILLIAM I. DENTON.

REFERENCES CITED

The following references are of record in the file of this patent:

UNITED STATES PATENTS

| Number | Name | Date |
|---|---|---|
| 1,920,795 | Jaeger | Aug. 1, 1933 |
| 1,991,955 | Ralston | Feb. 19, 1935 |
| 2,033,537 | Ralston et al. | Mar. 10, 1936 |
| 2,205,076 | Wortz | June 18, 1940 |
| 2,314,894 | Potts et al. | Mar. 30, 1943 |
| 2,331,968 | Forney | Oct. 19, 1943 |
| 2,337,421 | Spence et al. | Dec. 21, 1943 |
| 2,337,422 | Spence et al. | Dec. 21, 1943 |
| 2,381,472 | Teter | Aug. 7, 1945 |
| 2,381,709 | Apgar et al. | Aug. 7, 1945 |
| 2,432,532 | Mahan | Dec. 16, 1947 |